US010293520B1

(12) United States Patent
Boles et al.

(10) Patent No.: US 10,293,520 B1
(45) Date of Patent: May 21, 2019

(54) METHODS AND APPARATUS FOR HIGH TEMPERATURE THERMOCOUPLE INSTALLATION

(71) Applicant: The United States of America as represented by the Secretary of the Air Force, Washington, DC (US)

(72) Inventors: William E Boles, South Charleston, OH (US); James R Taylor, Saint Paris, OH (US); Christopher T Allen, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 307 days.

(21) Appl. No.: 15/068,679

(22) Filed: Mar. 14, 2016

Related U.S. Application Data

(60) Provisional application No. 62/143,492, filed on Apr. 6, 2015.

(51) Int. Cl.
*B29L 31/34* (2006.01)
*B29C 39/10* (2006.01)
*B29C 39/26* (2006.01)

(52) U.S. Cl.
CPC .............. *B29C 39/10* (2013.01); *B29C 39/26* (2013.01); *B29L 2031/34* (2013.01)

(58) Field of Classification Search
CPC ...... B29C 39/10; B29C 39/26; B29L 2031/34
See application file for complete search history.

(56) References Cited

U.S. PATENT DOCUMENTS

| 3,954,508 A | 5/1976 | Derby |
| 7,465,086 B1 | 12/2008 | Foreman |
| 7,794,141 B2 | 9/2010 | Perry et al. |

OTHER PUBLICATIONS

Croom, Lowering Costs & Improving Reliability in Claus Temperature Measurement, Proceedings of Sulfur 2001 International Conference, 2001, Marrakech, Morroco.
Rempe, Evaluation of Specialized Thermocouples for High-Temperature In-Pile Testing, Proceedings of ICAAP, Jun. 4-8, 2006, Paper 6068, Reno, NV.
Allen, Instrumentation Advances for Thermocouple Attachment to Composite Structures in Extreme Environments, International Test and Evaluation Association, Apr. 13, 2014.

*Primary Examiner* — Robert J Grun
(74) *Attorney, Agent, or Firm* — AFMCLC/JAZ; David Franklin

(57) ABSTRACT

A method for bonding and encapsulating a sensor to a substrate by using a mold having a top surface, a bottom surface, a void, and a channel includes disposing the flexible mold in contact with a surface of the substrate. The method further includes passing the sensor through the channel and terminating the sensor within the void at an offset distance from the substrate. The method further includes filling the void and encapsulating the sensor with a substantially fixed volume and substantially fixed geometry of cement.

11 Claims, 3 Drawing Sheets

METHODS AND APPARATUS FOR HIGH TEMPERATURE THERMOCOUPLE INSTALLATION

Pursuant to 37 C.F.R. § 1.78(a)(4), this application claims the benefit of and priority to prior filed Provisional Application Ser. No. 62/143,492, filed Apr. 6, 2015, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to temperature measurement methods and apparatus, and, more particularly, to improving high temperature thermocouple installation techniques and measurement accuracy.

BACKGROUND OF THE INVENTION

A typical constraint on the measurement capability of a thermocouple (TC) is the oxidizing point of the base metals. In most cases, when a bimetallic structure is exposed to temperatures above the manufacturer's recommendations, the materials begin to breakdown. This inevitably degrades the welding joint and eventually destroys the circuit.

Aerospace researchers are utilizing advanced modeling and simulation techniques to accurately measure the effects of common thermo-mechanical loads present in common flight profiles. To increase model fidelity, precise dimensions must be applied to the model for the results to match the physical specimen. Installation techniques provided by TC vendors detail procedures for their products to adhere to the surface, but the amount of adhesive used can alter the dynamic response of the material being characterized. Additionally, variability of the TC placement within the encapsulating material, and variability of the TC with respect to the test specimen, can impact data integrity. Excessive adhesive shields the substrate from exposure to ambient heat sources, thus skewing results. Furthermore, irregularities in the geometry or thickness of the adhesive patch used to encapsulate the TC will degrade data accuracy.

There are several methods known to the art for attachment of high temperature TCs. While ceramic adhesives may generally adhere to composite structures, the attachment techniques often varies from project to project. Ceramic adhesive instructions provide proper mixing ratios and curing temperatures and times but, the amount of adhesive to use is left to the user's discretion. Because of this, an unknown amount is often applied to the attachment site, and this amount varies from application to application (and may vary as a result of different technicians' preference).

This technique presents several problems. First, a larger amount of adhesive results in an increased surface area coverage of the specimen. This is known to induce varying flux rates, thus altering the resultant thermal test data. In addition, without a standardized size and shape, correlating the data to the adhesive geometry becomes difficult. An accurate finite element analysis (FEA) is predicated on known material properties and the dimensions through which they interact. An undefined shape can only be estimated with relatively poor fidelity.

An improvement over the above noted method is to protect the TC bead by placing the bead inside a rectangular cap of known dimensions made from Carbon-Carbon. These caps may be attached to composite structures using a graphite-based adhesive applied to the edges and a generous amount injected into the underside cavity of the cap.

While these structures provided more accurate dimensions for FEA, their size and material properties limited their use. A device that produced a smaller footprint and could be applied to a wide variety of structures (both composite and metallic) was required in order to create a laboratory-standard method for TC attachment. This is especially true when the mass of the cap is a non-trivial ratio of the specimen's mass.

Therefore, there exists a need in the art for a method to encapsulate a miniaturized TC with a consistently dimensioned and positioned adhesive barrier at a desired attachment site, thus increasing analysis capabilities and extending the TC life at extreme temperatures.

SUMMARY OF THE INVENTION

The present invention overcomes the foregoing problems and other shortcomings, drawbacks, and challenges of emplacing high temperature thermocouples while reducing installation variables that may skew data acquisition accuracy. While the invention will be described in connection with certain embodiments, it will be understood that the invention is not limited to these embodiments. To the contrary, this invention includes all alternatives, modifications, and equivalents as may be included within the spirit and scope of the present invention.

According an embodiment of the present invention, a method for bonding and encapsulating a sensor to a substrate by using a mold having a top surface, a bottom surface, a void, and a channel is provided. The method includes disposing the flexible mold in contact with a surface of the substrate. The method further includes passing the sensor through the channel and terminating the sensor within the void at an offset distance from the substrate. The method further includes filling the void and encapsulating the sensor with a substantially fixed volume and substantially fixed geometry of cement.

According to another embodiment of the disclosed invention, a kit for consistently encapsulating and bonding a sensor to a substrate is provided. The kit includes a flexible mold having a void and a fenestration. The kit further includes a sensor, and a sensor and a first cement having a first viscosity. The kit further includes a second cement having a second viscosity that is lower than the first viscosity. A template is configured to serve as a fixed-volume and fixed geometry masking surface for an application of the second cement on the substrate.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1A:
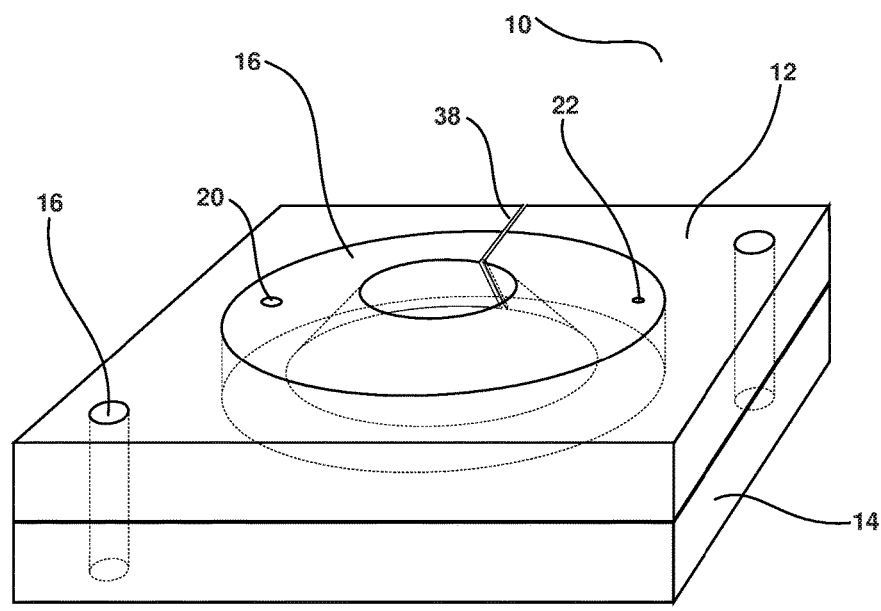
FIG. 1A is a perspective view illustrating a rigid mold for use in performing methods in accordance with embodiments of the disclosed invention.

Turning attention to FIG. 1A, an apparatus is depicted for use in performing a disclosed method of thermocouple installation. A rigid mold 10, has a first portion 12 and a second portion 14 joined by guide pins 16. The first portion 12 and second portion 14 are separable, and when joined, are maintained in alignment by the guide pins 16. The aligned and joined first portion 12 and second portion 14 form a substantially liquid tight union at the perimeter of the first portion 12 and second portion 14. Material is removed from the first portion 12 to form a cavity 18 therein. It should be recognized by one of ordinary skill in the art that the cavity 18 may be disposed within the second portion 14, or disposed within both of the first portion 12 and second portion 14. The cavity 18 is subsumed by the volume of the rigid mold 10, with the exception of an injection port 20 and a vent port 22. The injection port 20 facilitates introduction of a compound into the rigid mold 10 and the vent port 22, allows air to escape as the cavity 18 is filled with the compound. In some embodiments of the disclosed invention, the compound may be a two component Room Temperature Vulcanizing (RTV) silicone. A channel 38 may be optionally included in the rigid mold 10, and will be described in greater detail below.

Figure 1B:
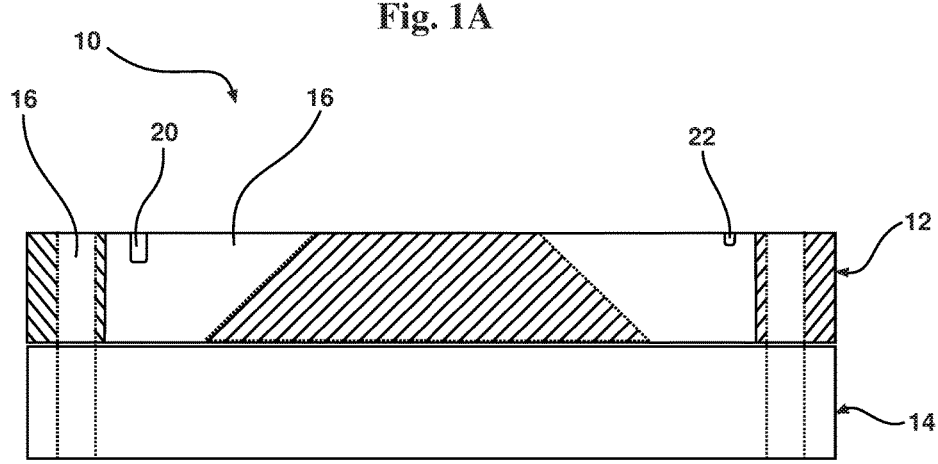
FIG. 1B is a cross sectional view of a rigid mold for use in performing methods in accordance with embodiments of the disclosed invention.

FIG. 1B is a cross sectional view of FIG. 1A, bisected by a plane passing transverse to the first portion 12 and second portion 14.

Figure 2:
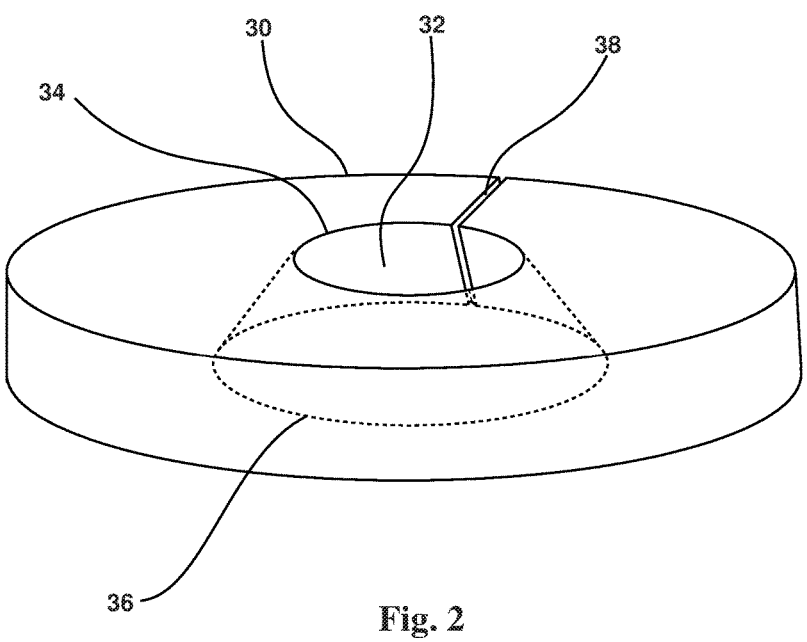
FIG. 2 is a perspective view illustrating a flexible mold for use in performing methods in accordance with embodiments of the disclosed invention.

Turning attention to FIG. 2, the rigid mold 10 (see FIG. 1) may be used to fabricate a corresponding flexible mold 30. The flexible mold 30 may include a void 32. In some embodiments of the disclosed invention, the void 32 may form a frustoconical geometry having a first end 34 of a first diameter, and a second end 36 of a second diameter. In some embodiments of the disclosed invention, the first end 34 is smaller than the second end 36. Other embodiments of the disclosed invention may incorporate a channel 38 into the flexible mold 30. The channel 38 may be configured to allow a conductor or other external structure to pass through the perimeter of the flexible mold 30 when the flexible mold 30 is emplaced on a substrate.

While it has been observed that a flexible mold 30 provides a good mating interface between the flexible mold 30 and another surface (e.g., a substrate 50 discussed below) more rigid embodiment may produce acceptable results if mated to the substrate 50 with gaskets, sealants, or the like. Additionally, while the flexible mold 30 facilitates release from the emplaced cement 54 (discussed in further detail below), higher degrees of rigidity may provide acceptable results if appropriate mold release geometries are selected (e.g. no undercut features that would trap cement 54 within the flexible mold 30).

Figure 3:
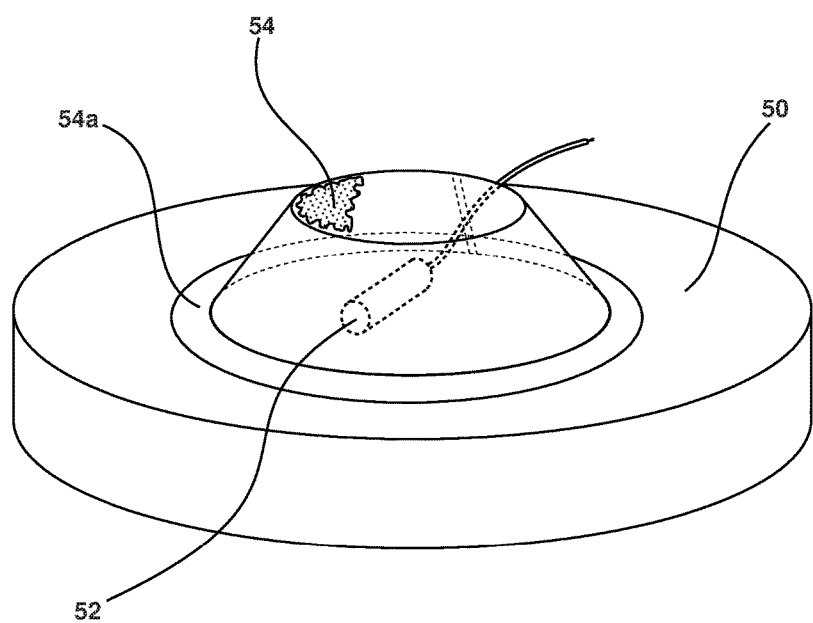
FIG. 3 is an illustration of a structure resulting from use of embodiments of the disclosed invention.

FIG. 3 depicts an embodiment of the disclosed invention while in use. The flexible mold 30 may be placed on a substrate 50. A thermocouple 52, or other electrical or mechanical sensor, to include a strain gauge, accelerometer, optical sensor, vibration sensor, or the like, may be passed through the channel 38 and disposed within the void 32. The flexible mold 30 and thermocouple 52 may be temporarily secured to the substrate 50 using pressure sensitive adhesive (PSA) tape or other method known to the art. A cement 54, adhesive, or other sealing compound is introduced into the void 32, thus encapsulating the thermocouple 52 and bonding the thermocouple 52 to the substrate 50. In some embodiments of the disclosed invention, the thermocouple 52 is disposed in contact with the substrate 50, and in other embodiments, the thermocouple 52 is disposed at a fixed distance from the substrate 50. Depending on the cement 54 used, a weight may be applied to the flexible mold 30 during the curing of the cement 53. The weight may include a central hole that coincides with the opening of the void 32, to allow off gassing of the curing cement 54.

Once the cement 54 has cured, any overfill of the cement 54 may be ground flush with the top of the flexible mold 30. In practice, to prevent damage to the flexible mold 30, the flexible mold 30 may be first peeled away from the overfill of the cement 54, and grinding of the overfill may then be performed. Given the relatively small dimensions of the cured cement 54, non-aggressive abrasives, for example, 320 grit or finer, may be used in conjunction with a handheld rotary tool. The extent to which grinding should be stopped will be obvious by observing the point at which the bulbous overfill or sprue portion transitions to a sharp shoulder of the frustoconical geometry. In other embodiments, overfill is managed by screeding the top of the flexible mold 30 with a straight edge prior to curing.

In some embodiments of the disclosed invention, a base layer or primer layer is first applied to the substrate 50 to enhance the bond of the cement 54 and to dispose the thermocouple 52 at a fixed, but small, standoff distance from the substrate 50. For example, a lower viscosity preparation of the cement 54a (not shown) may first be applied to the substrate 50 to readily bond to attachment facets of the substrate 50 surface. A thermocouple 52 placed in direct contact with the cured base layer is therefore disposed at an offset distance from the substrate 50 at a dimension equal to the thickness of the base layer. In some embodiments of the disclosed invention, the dimensions of the base layer are standardized by screeding the low viscosity cement 54a over a template (using a razorblade, straightedge, or other screed known to one of skill in the art) having a known geometry and known thickness. For example, a template of PSA tape having a hole punched therein, will provide a base layer of known shape, thickness, and therefore, known volume.

In use, the flexible mold 30 may be used to yield an encapsulated thermocouple 52 assembly, of known geometry, know volume, and with the thermocouple 52 disposed at a known offset from the substrate 50 (and inferentially, at a known distance from a heat source). As a result, instrumentation precision is improved in several ways. First, installer or technician variability is essentially removed from consideration. In the absence of the disclosed invention, each technician would introduce unknown quantities and shapes of cement 54 when encapsulating and bonding the thermocouple 52. Additionally, the location of the thermocouple 52 with respect to the substrate 50 and heat source (not shown), would be left to chance. Further, the footprint of the applied cement 54 results in thermal shielding of the substrate 50, and even identical volumes of cement 54 having disparate footprints (surface area of the substrate 50 covered by the cement 54), will yield different temperature transfer profiles.

It will be understood by one of ordinary skill in the art that the composition of the cement 54 will vary as a function of the composition of the substrate 50. It will be further recognized that standard surface preparation techniques should still be observed while using the disclosed invention. For example, for substrates including carbon fiber, stray shards of fiber should be removed with low tack tape or by other techniques known to one of ordinary skill in the art. Additionally, laboratory grade alcohol, methyl ethyl ketone, or other approved solvent should be used to remove any surface contamination.

It has been observed that commercially available preparations of graphite and ceramic based adhesives are ill-suited for use in thermocouple bonding applications. While commercial compositions of graphite or ceramic based adhesives produce suitable results as refractory material in high temperature industrial ovens, furnaces, and the like, standard compositions do not recognize or ameliorate the problems associated with high temperature thermocouple bonding applications. The irregular, and relatively large, granule size of commercially available compositions provides an inferior bond to a substrate, as compared to cements 54 used in the disclosed invention (which will be described in greater detail below). Additionally, the disclosed cement 54, having improved uniformity and specifically selected granule sizes, yields an encapsulation with reduced voids or inclusions. The reduction of such voids yields a more homogenous mass that is amenable to consistent finite element analysis techniques. Additionally, the resulting encapsulation has enhanced resistance to fissures or spalling that may result from thermal loads being applied to a void-riddled encapsulation.

It has been observed that commercial graphite or ceramic based adhesives having an average granule size of about 0.02-0.04 $mm^2$, are susceptible to the formation of inclusions noted above. However, acceptable results have been observed by using a cement 54 of the disclose invention having an average granule size between about 0.006 and 0.008 $mm^2$ effectively reduce voids and inclusions in the emplaced encapsulation. In some embodiments, a cement 54 having an average granule size of 0.0072 $mm^2$ produces acceptable results.

In some embodiments of the disclosed invention, the frustoconical geometry of the void 32 may be defined by a circular base of 0.4", a circular top of 0.2", and a thickness of 0.1". Other embodiments of the disclosed invention may use a void 32 geometry that is hemispherical, or a truncated hemisphere. It has been observed that orthogonal transitions between the void 32 and substrate 50 (for example, a cylindrical shape in contact with the substrate 50) may yield poor results. Cracking at the transition point may occur with unacceptable frequency, and geometries having a top surface greater than or equal to the base may be subjected to unnecessarily high heat flux during test procedures.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for bonding and encapsulating a sensor to a substrate by using a mold having a top surface, a bottom surface, a void, and a channel, the method comprising:
    disposing the flexible mold in contact with a surface of the substrate;
    passing the sensor through the channel and terminating the sensor within the void at an offset distance from the substrate; and
    filling the void and encapsulating the sensor with a substantially fixed volume and a substantially fixed geometry of cement.

2. The method of claim one, wherein the fixed volume of cement is accomplished by screeding overfilled cement off of the top of the flexible mold prior to curing the cement.

3. The method of claim 1, wherein the fixed volume of cement is accomplished by removing overfilled cement to a level coincident with the top of the flexible mold subsequent to curing the cement.

4. The method of claim 1, further including the step of applying a weight to the top of the flexible mold.

5. The method of claim 4, wherein the weight includes a hole disposed coincident with a portion of the void, wherein the hole is configured to facilitate off gassing of the cement.

6. The method of claim 1, wherein the surface of the substrate is prepared by applying a basecoat of a lower viscosity cement.

7. The method of claim 6, wherein the basecoat of the lower viscosity cement is applied by screeding the lower viscosity cement within an area of a template.

8. The method of claim 1, wherein the void is configured with a frustoconical geometry.

9. The method of claim 1, wherein the void is configured with a hemispherical geometry.

10. The method of claim 9, wherein the hemispherical geometry is truncated.

11. The method of claim 1, wherein the sensor is a thermocouple.

* * * * *